United States Patent [19]
Liebmann et al.

[11] Patent Number: 5,815,416
[45] Date of Patent: Sep. 29, 1998

[54] METHOD OF MEASURING ENERGY CONSUMPTION IN A CIRCUIT SIMULATOR

[75] Inventors: Peter Liebmann, Redwood City; Michael N. Misheloff, Dublin; David C. Chapman, Santa Clara, all of Calif.

[73] Assignee: VLSI Technology, Inc., San Jose, Calif.

[21] Appl. No.: 634,798

[22] Filed: Apr. 19, 1996

[51] Int. Cl.$^6$ ............................. G01R 21/06; G06F 17/50
[52] U.S. Cl. ......................... 364/578; 364/483; 324/142
[58] Field of Search ..................................... 364/578, 488, 364/489, 490, 491, 483; 395/500; 324/142

[56] References Cited

U.S. PATENT DOCUMENTS

| | | | |
|---|---|---|---|
| 4,800,333 | 1/1989 | Milkovic | 364/844 |
| 4,858,141 | 8/1989 | Hart et al. | 364/483 |
| 5,481,469 | 1/1996 | Brasen et al. | 364/491 |
| 5,521,834 | 5/1996 | Crafts et al. | 364/489 |
| 5,602,753 | 2/1997 | Fukui | 364/489 |
| 5,668,732 | 9/1997 | Khouja et al. | 364/483 |
| 5,673,420 | 9/1997 | Reyes et al. | 395/500 |

OTHER PUBLICATIONS

Sung Mo Kang, "Accurate Simulation of Power Dissipation in VLSI Circuits," Oct. 5, 1986, IEEE Journal of Solid–State Circuits, vol. SC–21, No. 5.

Hirata et al., "Estimation of Short–Circuit Power Dissipation for Static CMOS Gates", IEICE Trans Fund, vol. E79–A, No. 3 Mar. 1996, pp. 304–311.

Venuru et al., "Short–Circuit Power Dissipation Estimation for CMOS Logic Gates," IEEE Trans on Circ. & Sys. I–Fund Theory & Appl, vol. 41, Iss. 11, pp. 762–765.

Yang et al. (editors) "Estimating Power Dissipation in VLSI Circuits", IEEE Circuits & Devices Mag., vol. 10 ISS.4 pp. 11–19, Jul. 1994.

Evans et al, "Energy Consumption Modeling & Optimization for SRAMS", IEEE Jour. of Solid–State Cir., vol. 30 No. 5, Mar. 1995 pp. 571–579.

Powell et al., "A Model For Estimating Power Dissipation in a Class DSP VLSI Chips", IEEE Trans on Circ & Sys, vol. 38, No. 6, pp. 646–650, Jun. 1991.

*Primary Examiner*—Kevin J. Teska
*Assistant Examiner*—Tyrone V. Walker
*Attorney, Agent, or Firm*—Wagner, Murabito & Hao

[57] ABSTRACT

In a computer implemented circuit simulator, a method is provided for measuring energy consumption of a circuit under test during a measurement interval. The method comprises a series of computer implemented steps. A supply voltage is applied to the circuit under test. A current flowing through the circuit under test is then measured. A mirror voltage, representative of the value of the current, is generated. A capacitor is charged, with a power parameter voltage equal to the product of the supply voltage and the mirror voltage, during the measurement interval. An accumulated voltage is measured across the capacitor, wherein the accumulated voltage is representative of energy consumed by the circuit under test.

12 Claims, 4 Drawing Sheets

METHOD OF MEASURING ENERGY CONSUMPTION IN A CIRCUIT SIMULATOR

FIELD OF THE INVENTION

The present invention pertains to the field of electrical circuit simulation. More particularly, the present invention relates to an improved method for measuring energy consumed by a circuit under test.

BACKGROUND OF THE INVENTION

Advances in semiconductor technology have led the way towards more versatile, powerful, and faster integrated circuit (IC) chips in the fields of computer systems, telecommunications, instrumentation, etc. The trend is towards even larger, more complex and sophisticated IC chips in an effort to meet and improve upon the demands imposed by state-of-the-art performance. Moreover, logic density is increasing as designers attempt to fit additional circuitry within the physical constraints imposed by chip packaging. Today, a single IC chip can contain upwards of millions of transistors. As the complexity, functionalities, speed, and size of these chips increase, it is becoming a much more critical and difficult task to properly design, layout, and fabricate the next generation of chips. It takes a great deal of human effort, time, and capital resources to bring a new IC to market these days.

In order to minimize the risks associated with new circuit designs, computers have been used to simulate the functions of a new design before the design is ever released for manufacturing. In this manner, one can catch any bugs, unexpected defects, or undesirable side-effects early in the design stage and correct for them. Otherwise, a chip might later turn out to be defective. In which case, the designers must then fix the errors and wait for their manufacturers to turn another revised batch of IC chips. This process might have to be repeated over and over again until all errors have been discovered and fixed. Clearly, this would be an expensive, inefficient, as well as time-consuming process. Time to market is of critical importance in today's highly competitive environment. Long development cycles are a luxury of the past. Thus, virtually all new designs are extensively simulated before they are actually implemented.

Computers are ideally suited for simulating electrical performance parameters of a circuit design because they can rapidly calculate results according to a pre-programmed set of instructions. For example, the physics of transistors, resistors, capacitors, etc., are well-known. This information is stored in the computer's memory. When a number of different components are coupled together to form a new configuration, the computer can accurately model and predict to a fair degree, the actual performance of that new design. Thereby, designers can readily check the various parameters of their new circuit design, such as the circuit's frequency response, clock speed, energy consumption, reliability, heat dissipation, etc. Furthermore, based on the simulation, designers can experimentally modify and "tweak" their designs to achieve peak performance.

However, these electrical circuit simulators (e.g., SPICE) have a flaw inherent to the way in which they perform their calculations. Many of the circuit components' behavior emulated by the simulators exhibit non-linear characteristics. As a result, the simulators typically employ numeric integration to solve complex differential equations used to specify these various characteristics. For example, numeric integration is used in SPICE to calculate the current flowing through a capacitor as a function of time (i=C $\partial V/\partial t$).

Numeric integration is analytic integration applied in a piece wise linear manner. Time step control algorithms are used in SPICE and SPICE compatible simulators, to determine the time points where circuit equations are to be solved. The selection of time points relates directly to the accuracy of the numeric integration routines. In other words, large, complex equations are broken down into a host of smaller, easy-to-solve pieces. The accuracy of the result is increased if the pieces were to be made smaller and more numerous. This produces finer resolution.

However, specifying a greater number of samples is disadvantageous because it takes a tremendous amount of computing resources to process the multitudes of equations. Furthermore, gigabytes of disk storage may be consumed in storing the results. Hence, greater accuracy can be achieved, but only at the expense of sophisticated, powerful computer systems dedicated to running complex simulation programs for weeks on end. On the other hand, a faster approach would be to take less samples at greater time intervals. However, what one gains in faster turn-around time is sacrificed in terms of accuracy. Thus, designers are faced with the dilemma of choosing between fast turn-around with a lesser degree of accuracy or slow-turnaround with a greater degree of accuracy.

One area in which this flaw is especially troublesome is in simulating the energy consumption of an electrical circuit. Energy consumption is of extreme importance with respect to chips intended for usage in battery-operated devices (e.g., cellular telephones, laptop computers, radios, etc.). In order to measure simulated energy consumed by a simulated circuit under test during a measurement interval, it is necessary to determine the current flowing through the circuit under test as a function of time during the measurement interval. Some SPICE products offer a current averaging feature which provides an estimate of the simulated average current flow, as a function of time, through a specified node of a simulated circuit during a measurement time interval. The SPICE current-averaging module calculates the value of current once during a print interval. This print interval duration is variable and may be selected by a user. Again, the user is faced with the dilemma described above. That is, the accuracy of the SPICE current averaging measurement module improves as the selected print interval is decreased. However, the requisite processing time and memory space for data storage both increase as the selected print interval is decreased. Selecting a small enough print interval to achieve a desired level of accuracy may result in processing time requirements and memory space requirements which are beyond the bounds of practicality for many host computer systems. While, on the other hand, a larger print interval results in unacceptable degree of error. A simulation package is allowed a certain degree of error in its simulation results. If the error in energy consumption is too large, this means that the rest of the simulation package must meet tighter performance requirements.

Therefore, a need exists for an accurate, and yet, fast computer electrical circuit simulator for simulating energy consumption associated with a new circuit design. It would be preferable if such a simulator were to be adaptable to work with pre-existing simulators. The present invention provides one such solution. The present invention does not rely on averaging a current flow by recording during a print interval in order to measure energy consumed. Therefore, the problems associated with current averaging and the print interval are avoided in the method of the instant invention. Thereby, the present invention provides reduced processing time, less required memory space, and enhanced accuracy over typical prior art methods of measuring simulated energy consumption.

SUMMARY OF THE INVENTION

In a computer implemented electrical circuit simulation environment, a method is provided for measuring energy consumed by a simulated circuit under test during a measurement interval. The method includes a plurality of computer implemented steps. First, a simulated supply voltage is applied to a simulated circuit under test, thereby inducing a current through the simulated circuit under test. A power parameter voltage, being representative of the product of the supply voltage and the induced current, is generated and applied to a first terminal of a fixed value resistor which has a second terminal coupled to an integrating capacitor. In response, an accumulated voltage is induced across the integrating capacitor. The accumulated voltage is representative of energy consumed by the simulated circuit under test during the measurement interval.

In order to ensure that the accumulated voltage across the integrating capacitor is representative only of energy consumed by the circuit under test during the measurement interval, a pair of simulated switches are provided. The switches are electrically controlled to discharge the integrating capacitor just prior to the measurement interval and to allow the integrating capacitor to receive charge during the measurement interval.

The output of the power parameter voltage source depends on both a test voltage value and a test current value. In simulation systems which provide means for simulating both current controlled voltage sources and voltage controlled voltage sources, the power parameter voltage source may be readily simulated using standard simulation system methods. However, in simulators providing only voltage controlled voltage sources, it is necessary to translate the test current parameter values into voltage values so that a voltage controlled voltage source may be effectively controlled by the test current parameter values as well as the test voltage values. Therefore, a simulated current mirror circuit is provided for generating a voltage value, $V_{MIRROR}$, which is numerically equal to the current value of the current flowing through the circuit under test. The voltage value $V_{MIRROR}$, is then used to control a voltage controlled voltage source to generate the power parameter voltage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
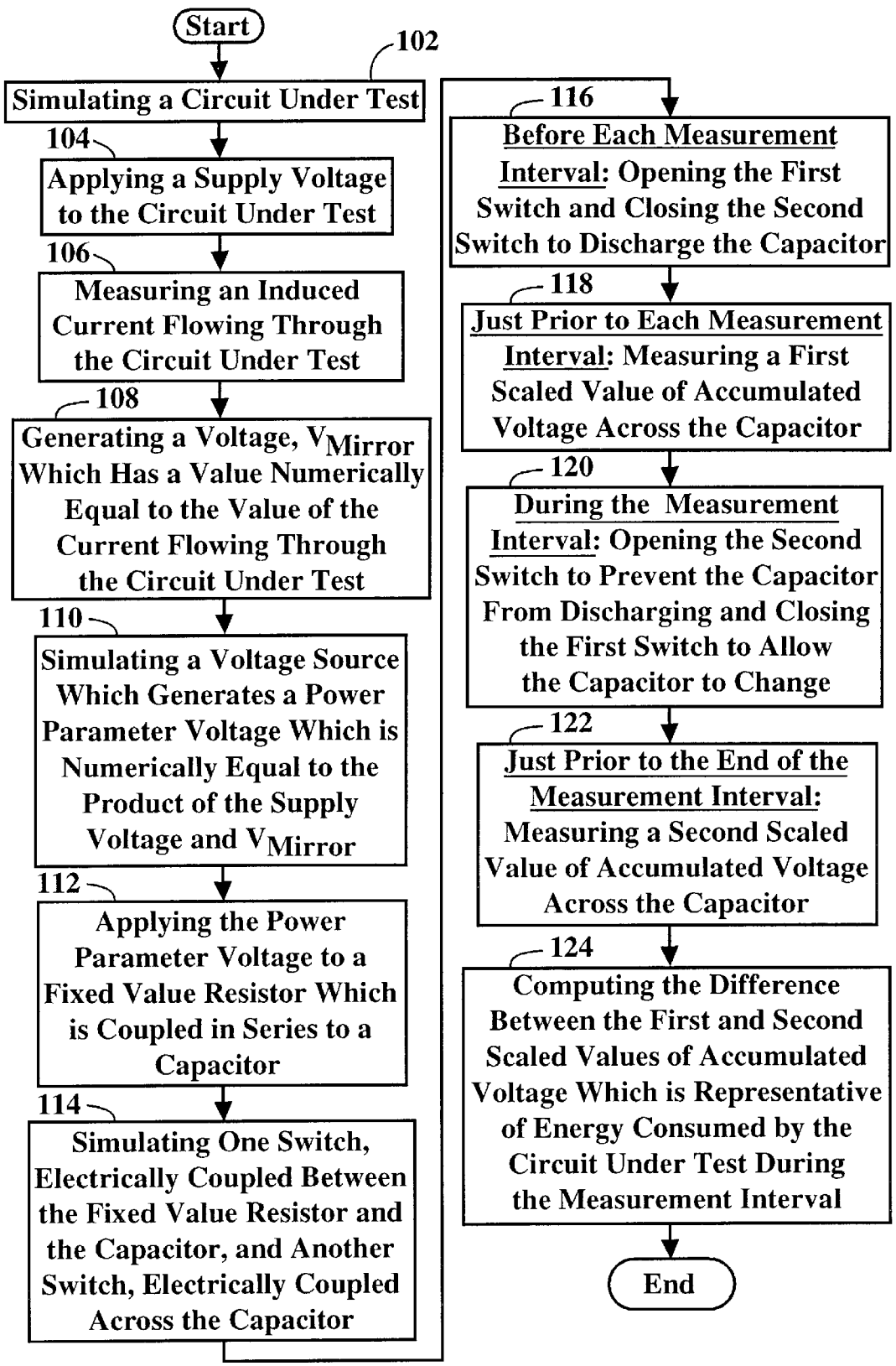
FIG. 1 illustrates a flow chart having a series of computer implemented steps which are necessary to implement the computer implemented method of the instant invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the computer implemented electrical circuit simulation arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "simulating", "measuring", "providing", "supplying", "flowing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

The instant invention provides a computer implemented method for measuring simulated energy consumed by a simulated circuit under test which is being modeled within a computer implemented electrical circuit simulator. It should be borne in mind that all of the circuit elements and quantities referred to below are computer simulated circuit elements and quantities which are representative of actual physical elements and quantities.

FIG. 1 illustrates a flow chart 100 having a series of computer implemented steps which are necessary to implement the computer implemented method of the instant invention. Computer implemented step 102 models a circuit under test, for example by creating circuit files which define the elements of the circuit under test. In step 104, simulation vectors are set so that a supply voltage is applied to the circuit under test. Step 106 measures the current flowing through the circuit under test. Step 108 generates a voltage value, $V_{MIRROR}$, which is numerically equal to the value of the current flowing through the circuit under test. Techniques for generating $V_{MIRROR}$ are discussed below. Step 110 generates a power parameter voltage value, $V_{POWER}$, which is numerically equal to the product of the supply voltage and $V_{MIRROR}$. Since $V_{MIRROR}$ is numerically equal to the measured current flowing through the circuit under test, the power parameter voltage is representative of the product of the supply voltage across the circuit under test and the measured current flowing through the circuit under test. The power delivered to any device as a function of time is given by the product of the instantaneous voltage across the device and the instantaneous current through it. $V_{POWER}$ is therefore representative of power delivered to the circuit under test as a function of time. Techniques for generating $V_{POWER}$ are discussed below. In step 112, the power parameter voltage, $V_{POWER}$, is applied to a fixed value resistor in series with a capacitor. During a measurement interval, the power parameter voltage supplies a quantity of energy to the capacitor. The energy supplied to the capacitor during the measurement interval is representative of the quantity of energy consumed by the circuit under test during the same measurement interval.

Step 114 calls for simulating switches which control the timing of energy consumption measurements so as to measure energy consumed by the circuit under test during a variable measurement interval. A first switch is coupled between the fixed value resistor and the capacitor. A second switch is coupled across the capacitor. Step 116 defines the positions of the switches before and after each measurement interval. Before each measurement interval, step 116 opens the first switch to prevent charging the capacitor and closes the second switch to discharge the capacitor so that the capacitor has no stored energy prior to the measurement interval. This step eliminates potential errors due to problems which will be discussed further below.

Step 118 is executed just prior to each measurement interval. Step 118 calls for measuring a first scaled value of accumulated voltage across the capacitor 310. The first measured value of accumulated voltage is scaled up so as to increase the value of the accumulated voltage to a convenient level, (e.g., 1 volt represents 1 nanojoule). Techniques for scaling up the level of accumulated voltage values are discussed below.

Step 120 defines the positions of the switches during the measurement interval. Step 120 closes the first switch 306 to allow the power parameter voltage source 302 to transfer energy to the integrating capacitor 310. Simultaneously, step 120 opens the second switch to prevent the integrating capacitor from discharging.

Step 122 is executed just prior to the end of the measurement interval at which time a second scaled accumulated voltage value is measured. The second measured value of accumulated voltage is scaled up so as to increase the value of the accumulated voltage to a convenient level, e.g. nanojoules. Techniques for scaling up the level of accumulated voltage values are discussed below. During step 124, the difference between the first and second scaled values of accumulated voltage is computed. The difference between the first and second scaled values of accumulated voltage is representative of energy consumed by the circuit under test during the measurement interval.

Figure 2:
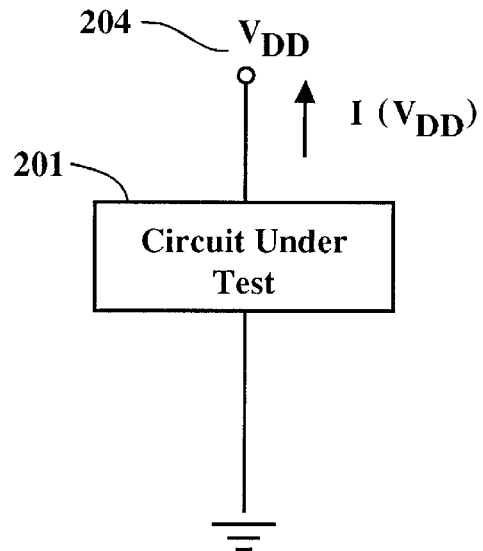
FIG. 2 shows a circuit block diagram of a simulated circuit under test as simulated by a prior art computer implemented simulator, e.g. SPICE or a SPICE compatible simulator.

FIG. 2 shows a circuit block diagram of a simulated circuit under test 201 as simulated by a prior art computer implemented simulator, such as SPICE or a SPICE compatible simulator. Simulation vectors are set such that the circuit under test 201 is electrically coupled between ground and a $V_{DD}$ power supply 204. The $V_{DD}$ power supply 204 provides a supply voltage, $V_{DD}$. After setting simulation vectors as described above, circuit performance simulation begins and an induced current, $I(V_{DD})$, flows through the circuit under test 201 into the $V_{DD}$ power supply 204. Means within the computer implemented simulator are then actuated to measure the induced current, $I(V_{DD})$, which flows through the circuit under test 201 into the $V_{DD}$ power supply 204.

Figure 3:
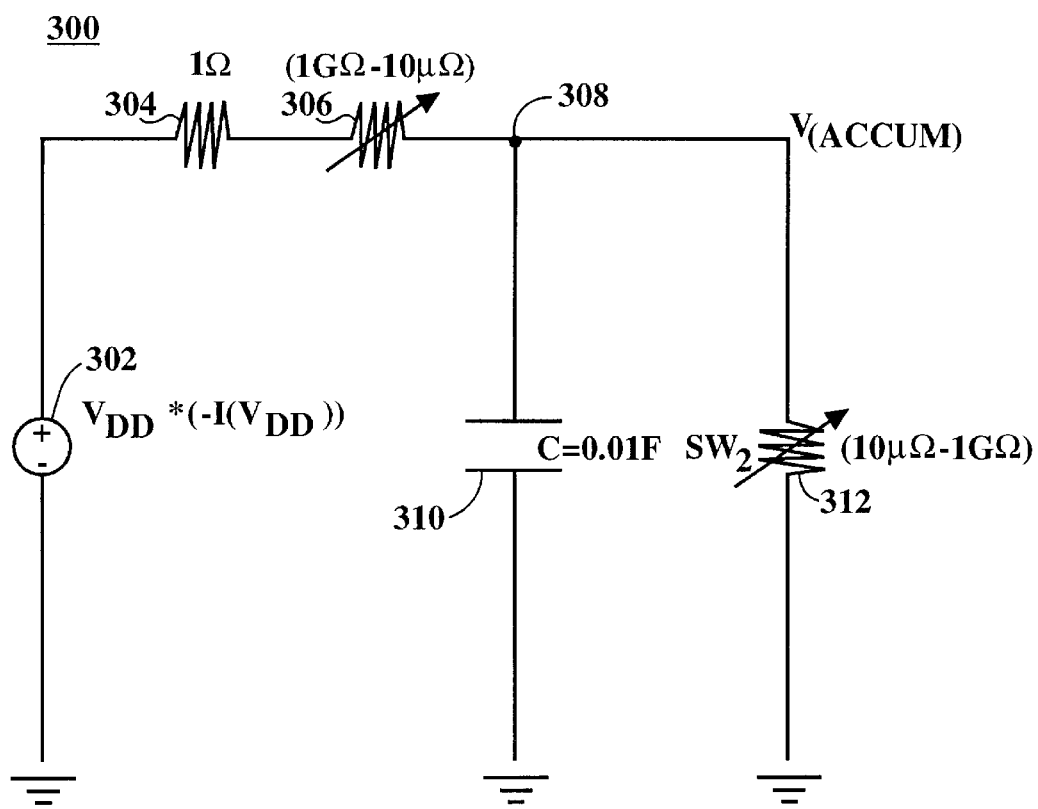
FIG. 3 is a schematic of a circuit diagram of a preferred embodiment of a simulated energy consumption measurement circuit.

FIG. 3 shows a circuit diagram of a preferred embodiment of a simulated energy consumption measurement circuit 300. A simulated voltage controlled voltage source 302 is electrically coupled between ground and a first terminal of a resistor 304. A first switch 306 is electrically coupled between a second terminal of the resistor 304 and a network terminal 308. An integrating capacitor 310, having a capacitance value C (e.g., 0.01 farad), in parallel with a second switch 312, is coupled between the network terminal 308 and ground.

Simulation vectors are set such that the voltage controlled voltage source 302 provides a voltage defined by equation (1):

$$\text{Power Parameter Voltage} = V_{POWER} = V_{DD} * (-I(V_{DD})) \quad (1)$$

Equation (1) defines the power parameter voltage, provided by the voltage source 302, as the product of the instantaneous voltage across the circuit under test 201 and the instantaneous current flowing through the circuit under test (see FIG. 2). The power delivered to any device as a function of time is given by the product of the instantaneous voltage across the device and the instantaneous current through it. Equation (1), therefore, is representative of power delivered to the circuit under test 201 as a function of time. Since the voltage controlled voltage source 302 provides a voltage having a value representative of power consumed by the circuit under test 201, then for purposes of the instant application the voltage source 302 will be referred to as a power parameter voltage source 302.

During operation of the simulated circuit 300, a measurement time interval is defined in which the first switch 306 is closed and the second switch 312 is open. During this measurement time interval, the power parameter voltage source 302 supplies energy to the integrating capacitor 310, through the resistor 304. While energy from the power parameter voltage source 302 is supplied to the integrating capacitor 310, a voltage, $V_{ACCUMULATED}$ is generated across the integrating capacitor 310. The accumulated voltage across the integrating capacitor is representative of energy consumed by the simulated circuit under test during the measurement interval.

The voltage, $V_{ACCUMULATED}$, represents the integrated energy consumption of the circuit under test 201, expressed in joules/C, where C is the capacitance value of the integrating capacitor. A very large value (e.g., 0.01 farads) is chosen for the capacitance, C, of the integrating capacitor so that the accumulated voltage across the capacitor will never be more than a few nanovolts.

The resistor 304, in the preferred embodiment, is selected to have a resistance of one ohm. With the resistor 304 having a value of one ohm, the current going into the capacitor is limited while the voltage across the capacitor is minimally affected since currents flowing in the circuit 300 are typically less than 1 mA at any given moment. The resistor 304 could be omitted but the capacitor 310 would then charge and discharge too quickly to match the dependent supply resulting in a loss of accuracy.

If the integrating capacitor 310 is not kept free of charge up to the beginning of the measurement interval, then there may be a voltage across the capacitor 310 which is due to transient current generated by the power parameter voltage source 302. An initial voltage, present across the capacitor 310 prior to the measurement interval, would cause an error in the above described measurement of energy consumption. An initial voltage across the capacitor 310 may be caused by quiescent currents generated by the circuit under test 201 before the measurement interval. Quiescent currents generated by the circuit under test 201 cause transient currents to be generated by the simulated power parameter voltage source 302 which depends on the value of current flowing through the circuit under test. See Equation (1).

In order to limit the amount of initial charge stored in the capacitor 310, prior to the beginning of a measurement time interval, the switches 306, 312 are electrically controlled so as to open and close accordingly. Before and after each measurement interval, the second switch 312 is closed so as to short the capacitor 310 and the first switch 306 is opened so as to prevent quiescent or transient current from the circuit under test 201 from controlling the voltage source 302 to deposit charge onto the electrodes of the capacitor. Just prior to the measurement interval, the voltage, $V_{ACCUMULATED}$, across the capacitor 310 is measured. During the measurement interval, the second switch 312 is open so as to allow current from the voltage source to distribute charge onto the electrodes of the capacitor. Also during the measurement interval, the first switch 306 is closed to allow current from the power parameter voltage source 322 to distribute charge onto the electrodes of the integrating capacitor 310. At the end of the measurement interval, the scaled accumulated voltage is measured once again and the difference in accumulated voltage is computed and returned as the overall energy consumption of the circuit under test during the measurement interval.

It is important to limit the voltage accumulated across the capacitor 310 because excess voltage on the capacitor 310 can discharge back into the dependent voltage supply 302, during intervals when the current is very small, if the voltage across the capacitor is greater than the power parameter voltage generated by the voltage source 302. This would result in a reduction in accuracy.

SPICE does not provide means for simulating an ideal switch having zero resistance while closed and infinite resistance while open. However, SPICE can provide simulated resistors which have a variable resistance ranging from 10 $\mu\Omega$ to 1 G$\Omega$. The first and second switches 306, 312 are simulated with variable resistors which are set to toggle between 10 $\mu\Omega$, approximating a closed circuit, and 1 G$\Omega$, approximating an open circuit.

If the switches 306, 312 are omitted from circuit 300, the initial voltage on the integrating capacitor 310, prior to the measurement interval, might be very large compared to the increase during simulation which would result in charge leaking back into the dependent voltage source 302 causing a loss of accuracy.

The output of the power parameter voltage source depends on both a voltage value and a current value. In simulation systems which provide means for simulating both current controlled voltage sources and voltage controlled voltage sources, the voltage source described above may be readily simulated according to computer implemented methods provided by the prior art simulator. However, in simulators providing only voltage controlled voltage sources, it is necessary to translate the test current parameter values into voltage values in order to control a voltage controlled voltage source.

Figure 4:
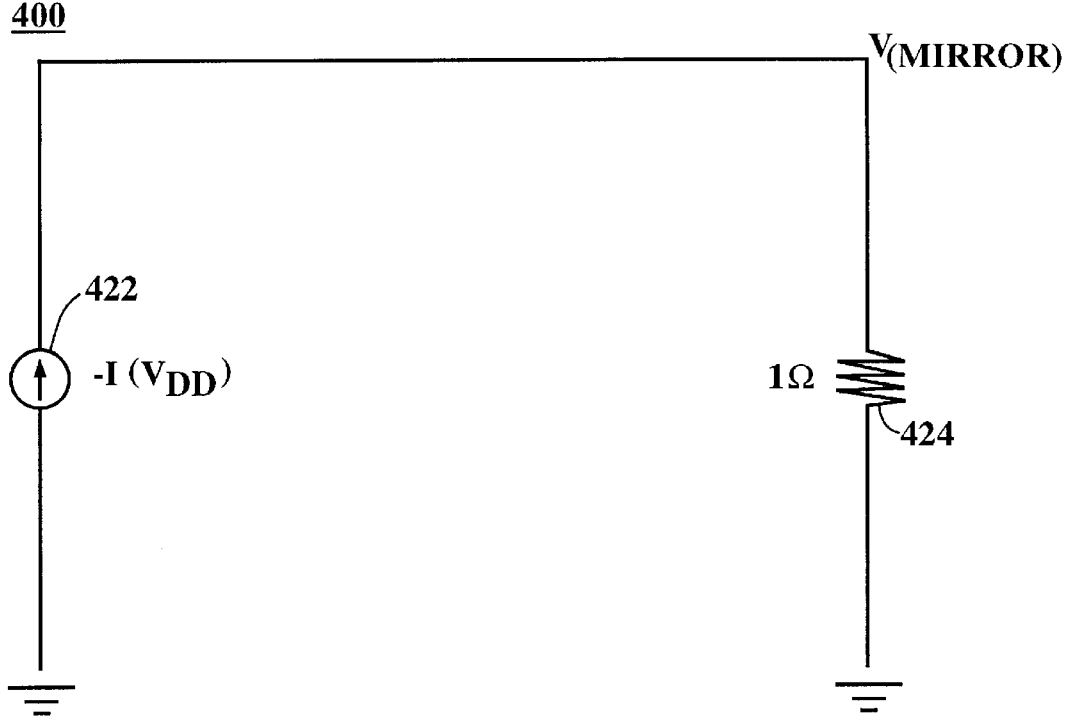
FIG. 4 shows a circuit diagram of a preferred embodiment of a simulated current mirror circuit.

FIG. 4 shows a circuit diagram of a preferred embodiment of a current mirror circuit 400 as simulated by a computer implemented simulator. The current mirror circuit 400 mirrors the current, $I(V_{DD})$, which flows into the circuit under test 201 (See FIG. 2) by generating a voltage, $V_{(mirror)}$, which is numerically equal to the value of the current, $I(V_{DD})$. Simulation vectors are set such that a current controlled current supply 422 is coupled in series with a one ohm resistor 424. The current supply 422 provides a current having a value, $I(V_{DD})$, which is numerically equal to the value of the current flowing out of the $V_{DD}$ power supply 204 and into the circuit under test 201 (See FIG. 2). The resistor 424 is selected to have a resistance value of one ohm so that the voltage, $V_{Mirror}$, generated across the resistor 424, is defined by Equation (2):

$$V_{Mirror}=(-I(V_{DD}))*1\text{ohm}=-I(V_{DD}) \qquad (2).$$

Figure 5:
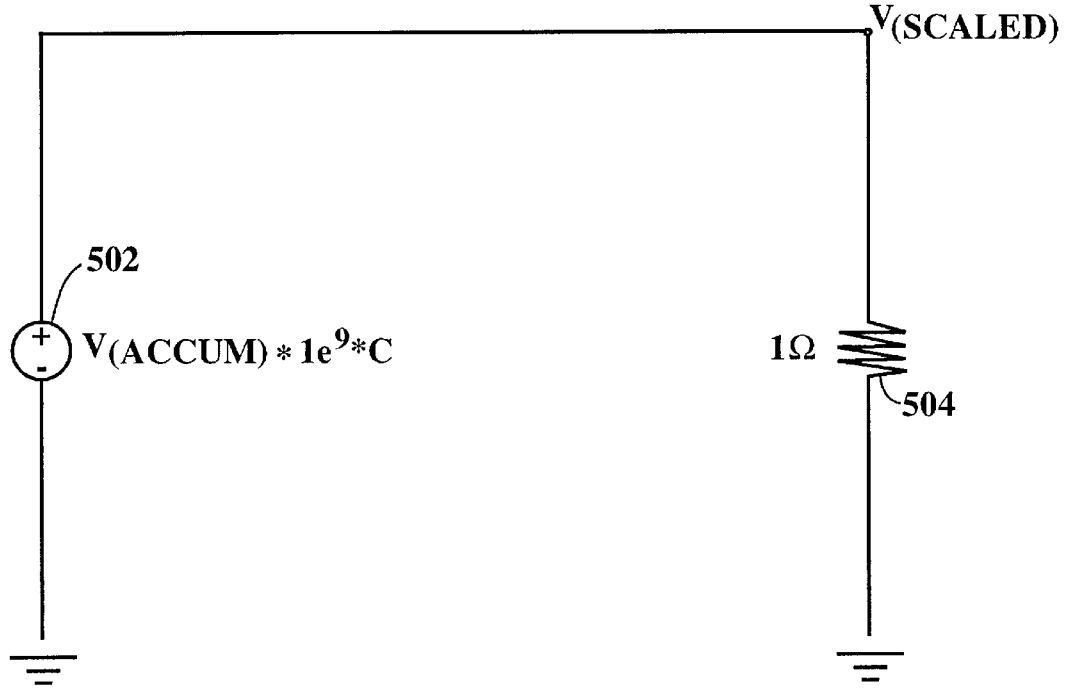
FIG. 5 shows a circuit diagram of a scaling circuit 500 which is employed to scale up the first and second measured values of accumulated voltage so as to increase the value of the accumulated voltage to a convenient level.

FIG. 5 shows a circuit diagram of a scaling circuit 500 which is employed to scale up the first and second measured values of accumulated voltage so as to increase the value of the accumulated voltage to a convenient level, e.g. nanojoules. The reason for scaling up the measured voltage values is that if the values are not scaled up somewhat, the circuit simulator may print the accumulated voltage values as 0.0 volts.

In the scaling circuit 500, a voltage dependent voltage source 502 generates a scaled up value, $V_{SCALED}$, of the accumulated voltage value, $V_{ACCUMULATED}$. The voltage generated by the voltage dependent voltage source 502 is applied across a one ohm resistor 504. The scaling factor built into the voltage dependent voltage source 502 is equal to $C*1e^9$ where C is the capacitance of the capacitor 310. The scaling factor, $1e^9$, is applied so that the circuit simulator does not print the accumulated voltage as zero volts. Multiplication by C is necessary to transform the first and second measured accumulated voltages, typically expressed in joules/C, into energy values expressed in joules.

The final step of the method computes the difference between the first and second scaled values of accumulated voltage. This quantity represents the amount of energy consumed by the circuit under test.

Figure 6:
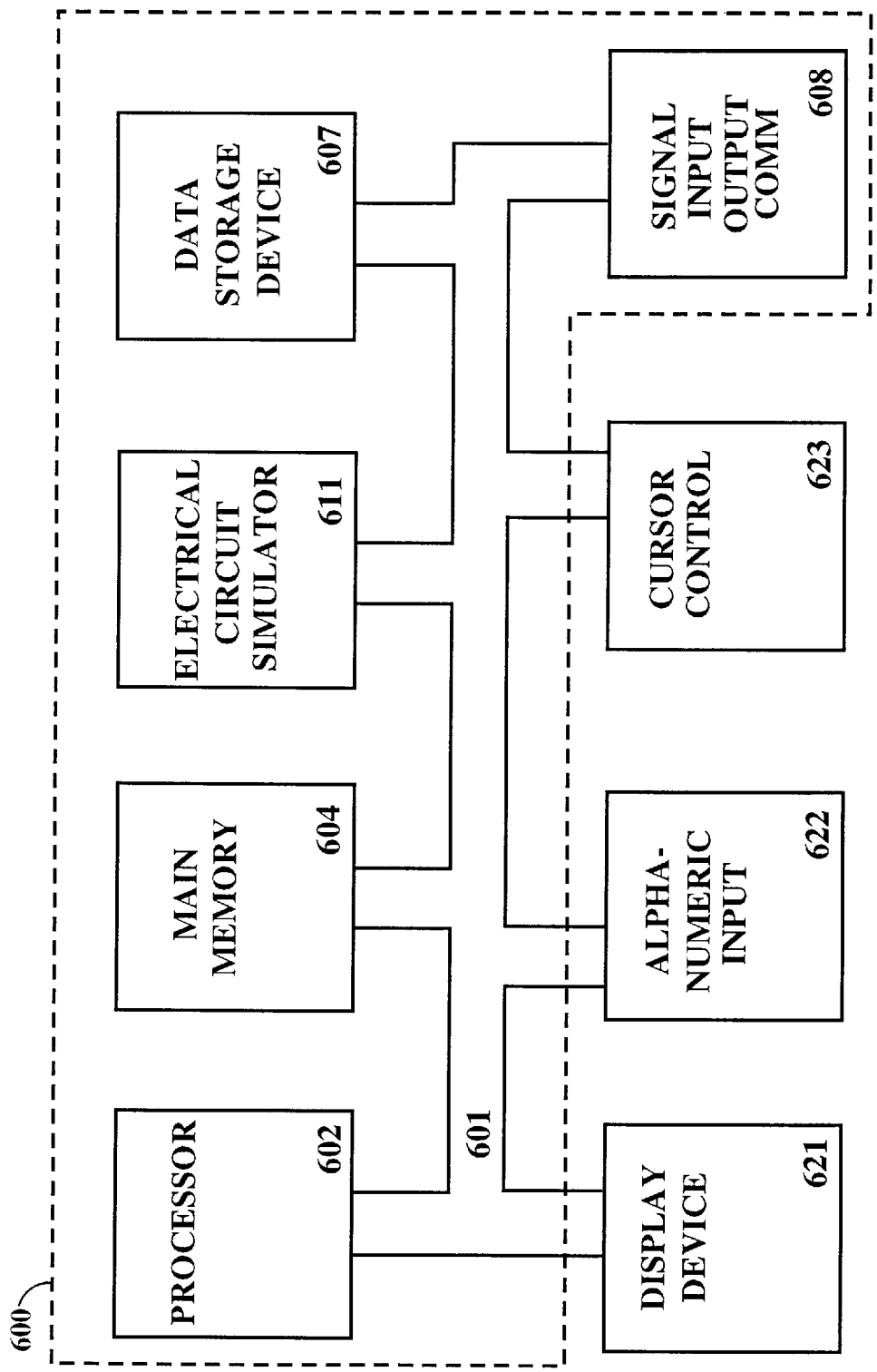
FIG. 6 illustrates an exemplary computer system upon which the present invention may be implemented or practiced.

FIG. 6 illustrates an exemplary computer system 600 upon which the present invention may be implemented or practiced. It is appreciated that the computer system 600 of FIG. 6 is exemplary only and that the present invention can operate within a number of different computer systems including general purpose computers systems, embedded computer systems, and computer systems specially adapted for computer-aided design/simulation. Computer system 600 of FIG. 6 includes an address/data bus 601 for conveying digital information between the various components, a central processor unit (CPU) 602 for processing the digital information and instructions, a main memory comprised of random access memory (RAM) 604 for storing the digital information and instructions. In addition, computer system 600 may also include a data storage device 604 (e.g., a magnetic, optical, floppy, or tape drive) for storing vast amounts of data, and an I/O interface 608 for interfacing with peripheral devices (e.g., computer network, modem, etc.). Devices which may be coupled to computer system 600 include a display device 621 for displaying information (e.g., simulation of circuits, frequency response, energy consumption, etc.) to a computer user, an alphanumeric input device 622 (e.g., a keyboard), and a cursor control device 623 (e.g., mouse, trackball, light pen, etc.) for inputting data and selections. Computer system 600 may also include specially designed circuits or programming for performing electrical circuit simulator functions.

What is claimed is:

1. In a computer implemented electrical circuit simulator, a method for measuring energy consumption of a simulated circuit under test during a predetermined time interval, comprising the computer implemented steps of:

applying a supply voltage to the circuit under test;

determining a current flowing through the circuit under test when the supply voltage is applied;

generating a second voltage which is a function of the value of the current flowing through the circuit under test;

simulating a voltage source which generates a third voltage equal to the product of the supply voltage and the second voltage;

applying the third voltage to a first terminal of a fixed value resistor which has a second terminal coupled to a capacitor;

simulating a first switch, electrically coupled between the fixed value resistor and the capacitor, and simulating a second switch, electrically coupled across the capacitor, wherein the first and second switches are implemented in the simulator with voltage variable resistors;

opening the first switch during time intervals other than during the predetermined time interval;

closing the second switch during time intervals other than during the predetermined time interval in order to discharge the capacitor;

opening the second switch during the predetermined time interval to prevent the capacitor from discharging;

closing the first switch during the predetermined time interval to allow the capacitor to charge during the predetermined time interval; and measuring a fourth voltage across the capacitor, wherein the fourth voltage is representative of energy consumed by the circuit under test.

2. The method of claim 1 further comprising the computer implemented steps of:

simulating a second voltage source which generates a voltage which is equal to the product of the fourth voltage, a capacitance value of the capacitor, and a constant;

electrically coupling a first terminal of the second voltage source to ground and a second terminal of the voltage source to a resistor; and measuring the voltage across the resistor wherein the voltage across the resistor is representative of a scaled value of energy consumed by the circuit under test.

3. In a computer implemented electrical circuit simulator, a method for measuring energy consumption of a simulated circuit under test during a predetermined time interval, comprising the computer implemented steps of:

applying a supply voltage to the circuit under test;

determining a current flowing through the circuit under test when the supply voltage is applied;

generating a second voltage which is a function of the value of the current flowing through the circuit under test;

charging a capacitor through a series resistor with a voltage source which generates a third voltage equal to the product of the supply voltage and the second voltage for a duration of the time interval; and measuring a fourth voltage across the capacitor, wherein the fourth voltage is representative of energy consumed by the circuit under test;

simulating a switch, electrically coupled between the series resistor and the capacitor;

opening the switch during time intervals other than during the predetermined time interval in order to prevent transient current from inducing erroneous voltage across the capacitor; and closing the switch during the predetermined time interval.

4. The method of claim 3 further comprising the computer implemented steps of:

simulating a switch, electrically coupled across the capacitor;

closing the switch during time intervals other than during the predetermined time interval in order to discharge the capacitor; and opening the switch during the predetermined time interval to prevent the capacitor from discharging.

5. The method of claim 3, further comprising the computer implemented steps of:

simulating a first switch, electrically coupled between the series value resistor and the capacitor;

simulating a second switch, electrically coupled across the capacitor;

opening the first switch during time intervals other than during the predetermined time interval in order to prevent transient current from inducing erroneous voltage across the capacitor;

closing the first switch during the predetermined time interval;

closing the second switch during time intervals other than during the predetermined time interval in order to discharge the capacitor; and opening the second switch during the predetermined time interval to prevent the capacitor from discharging.

6. The method of claim 3, further comprising the steps of:

simulating a first switch, electrically coupled between the series value resistor and the capacitor;

simulating a second switch, electrically coupled across the capacitor;

opening the first switch during time intervals other than during the predetermined time interval in order to prevent transient current from inducing erroneous voltage across the capacitor;

closing the first switch during the predetermined time interval;

closing the second switch during time intervals other than during the predetermined time interval in order to discharge the capacitor;

opening the second switch during the predetermined time interval to prevent the capacitor from discharging; and wherein the first and second switches are implemented in the simulator with voltage variable resistors.

7. The method of claim 3 further comprising the computer implemented steps of:

simulating a second voltage source which generates a voltage which is equal to the product of the fourth voltage, the capacitance of the capacitor, and a large number;

electrically coupling a first terminal of the second voltage source to ground and a second terminal of the voltage source to a resistor; and measuring the voltage across the resistor wherein the voltage across the resistor is representative of a scaled value of energy consumed by the circuit under test.

8. In a computer implemented electrical circuit simulator, a method for measuring energy consumption of a simulated circuit under test during a predetermined time interval, comprising the computer implemented steps of:

applying a supply voltage to the circuit under test;

determining a current flowing through the circuit under test when the supply voltage is applied;

generating a second voltage which is representative of the product of the supply voltage and the current;

charging a capacitor by applying the second voltage to a first terminal of a fixed value resistor which has a second terminal coupled to the capacitor wherein the capacitor is charged during the time interval;

measuring a third voltage across the capacitor after the time interval has elapsed wherein the third voltage is representative of energy consumed by the circuit under test;

simulating a switch, electrically coupled between the fixed value resistor and the capacitor;

opening the switch during time intervals other than during the predetermined time interval in order to prevent transient current from inducing erroneous voltage across the capacitor; and closing the switch during the predetermined time interval.

9. The computer implemented method of claim 8 further comprising the computer implemented steps of:

simulating a switch, electrically coupled across the capacitor;

closing the switch during time intervals other than during the predetermined time interval in order to discharge the capacitor; and opening the switch during the predetermined time interval to prevent the capacitor from discharging.

10. The computer implemented method of claim 8, further comprising the computer implemented steps of:

simulating a first switch, electrically coupled between the fixed value resistor and the capacitor;

simulating a second switch, electrically coupled across the capacitor;

opening the first switch during time intervals other than during the predetermined time interval in order to prevent transient current from inducing erroneous voltage across the capacitor;

closing the first switch during the predetermined time interval;

closing the second switch during time intervals other than during the predetermined time interval in order to discharge the capacitor; and opening the second switch during the predetermined time interval to prevent the capacitor from discharging.

11. The computer implemented method of claim 8, further comprising the steps of:

simulating a first switch, electrically coupled between the fixed value resistor and the capacitor;

simulating a second switch, electrically coupled across the capacitor;

opening the first switch during time intervals other than during the predetermined time interval in order to prevent transient current from inducing erroneous voltage across the capacitor;

closing the first switch during the predetermined time interval;

closing the second switch during time intervals other than during the predetermined time interval in order to discharge the capacitor;

opening the second switch during the predetermined time interval to prevent the capacitor from discharging; and wherein the first and second switches are implemented in the simulator with voltage variable resistors.

12. The computer implemented method of claim 8 further comprising the computer implemented steps of:

simulating a second voltage source which generates a voltage which is equal to the product of the fourth voltage, the capacitance of the capacitor, and a large number;

electrically coupling a first terminal of the second voltage source to ground and a second terminal of the voltage source to a resistor; and measuring the voltage across the resistor wherein the voltage across the resistor is representative of a scaled value of energy consumed by the circuit under test.

* * * * *